No. 784,980. PATENTED MAR. 14, 1905.
J. D. BUCHANAN.
EXCAVATING MACHINE.
APPLICATION FILED JULY 29, 1904.
2 SHEETS—SHEET 1.
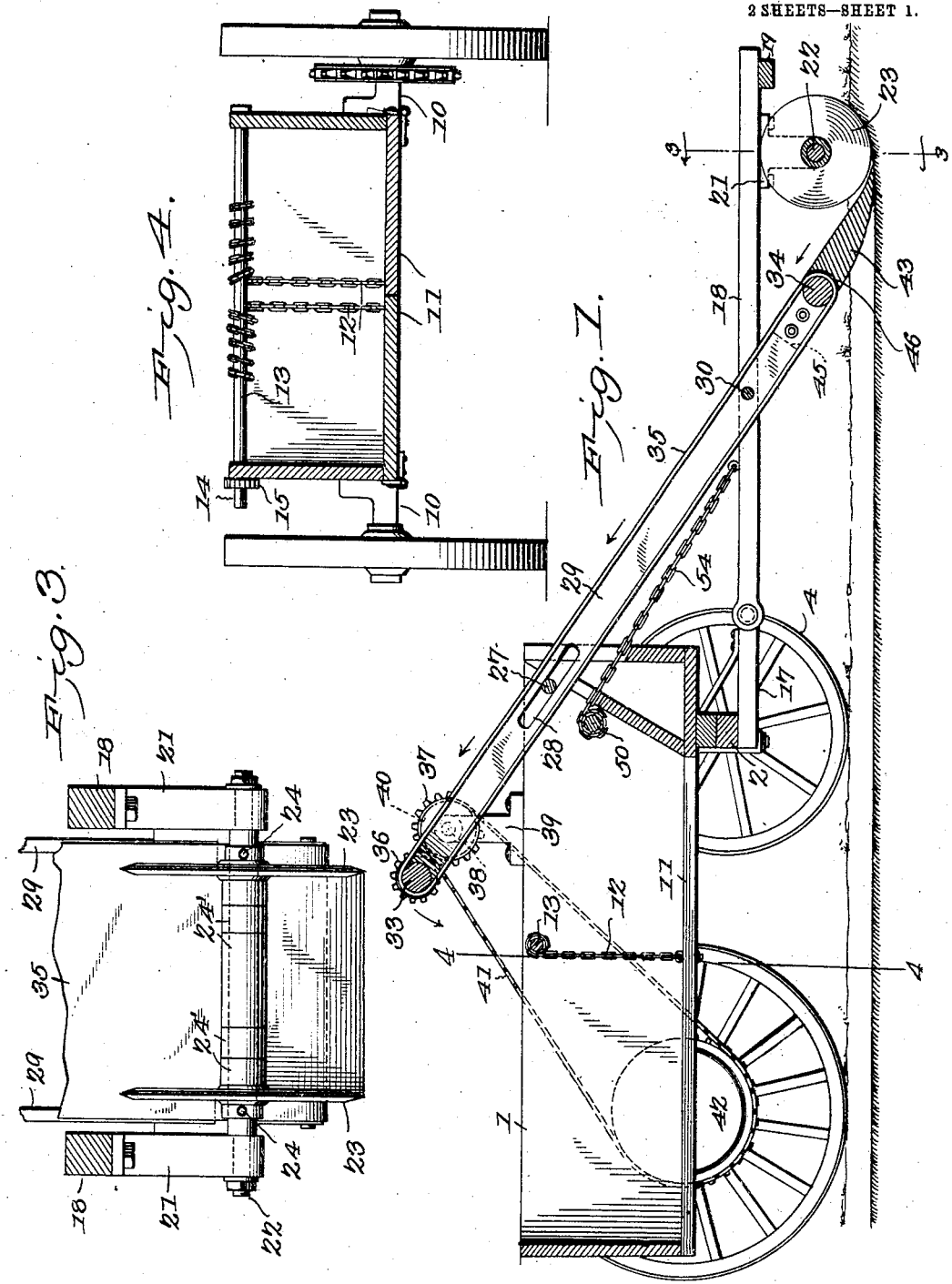
Witnesses
E. H. Stewart
Jno E Parker
John D. Buchanan, Inventor,
by C. A. Snow & Co
Attorneys

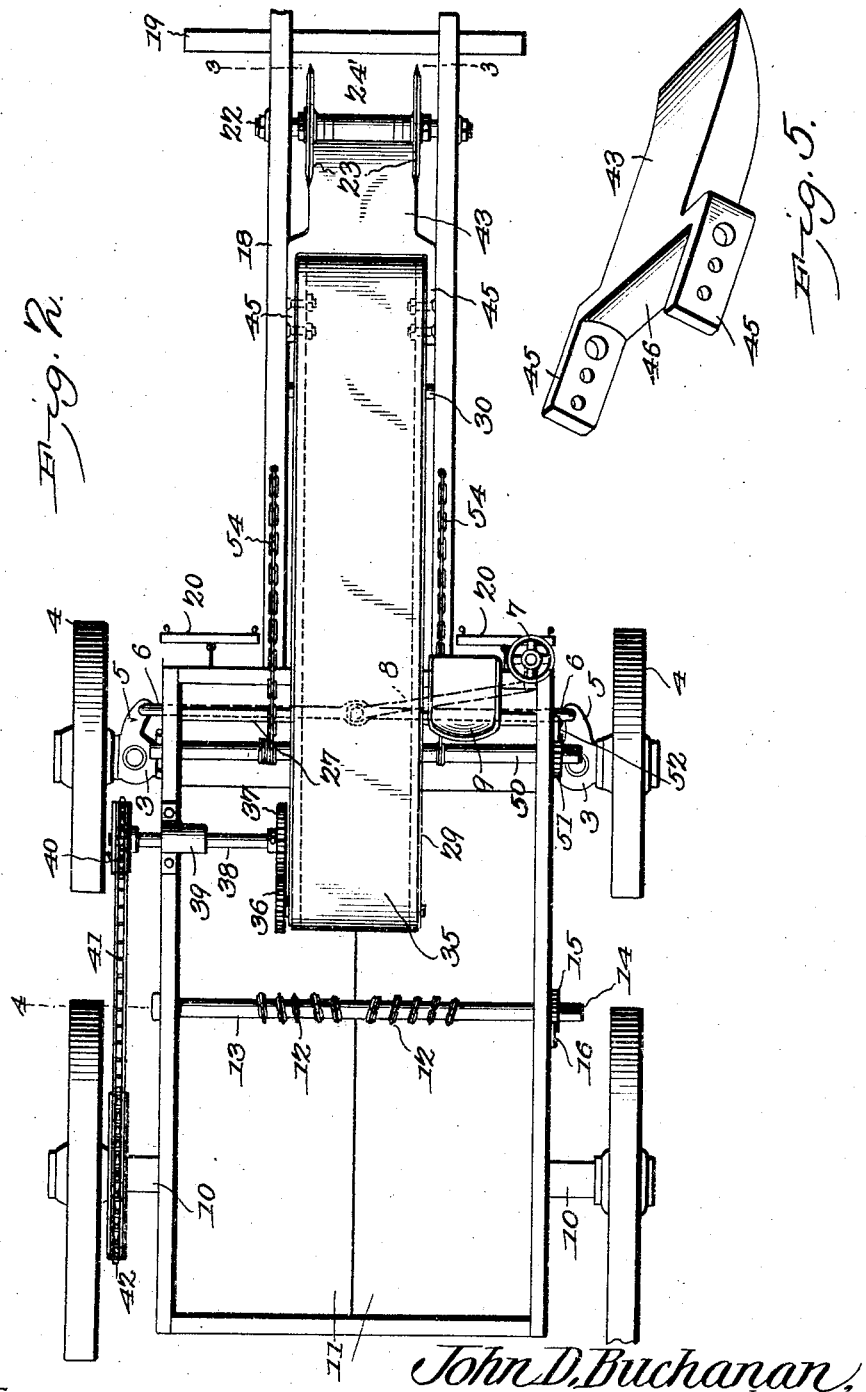

No. 784,980. Patented March 14, 1905.

UNITED STATES PATENT OFFICE.

JOHN D. BUCHANAN, OF MEMPHIS, TENNESSEE.

EXCAVATING-MACHINE.

SPECIFICATION forming part of Letters Patent No. 784,980, dated March 14, 1905.

Application filed July 29, 1904. Serial No. 218,718.

*To all whom it may concern:*

Be it known that I, JOHN D. BUCHANAN, a citizen of the United States, residing at Memphis, in the county of Shelby and State of Tennessee, have invented a new and useful Excavating-Machine, of which the following is a specification.

This invention relates to improvements in machines employed for grading, excavating, and similar purposes, and has for its principal object to provide a light-running and readily-operated machine of the self-loading type in which provision is made for excavating or cutting to any desired level and automatically conveying the excavated material to a suitable receptacle as the machine is traveled along the ground.

A further object of the invention is to provide a device of this class in which the cutter or excavating device is so mounted on the vehicle as to permit of its ready adjustment to inoperative position while the machine is being moved to a dumping-point.

A still further object of the invention is to provide a mechanism of this class in which the cutting or excavating devices are made adjustable and interchangeable, so that a cut of any width or depth can be made.

A still further object of the invention is to provide for the automatic disconnection of the actuating mechanism during movement of the conveying and excavating devices to inoperative position.

A still further object of the invention is to provide a vehicle or carrier having a dirt-receptacle of large capacity so arranged that the excavated material may be readily dumped therefrom without interfering with the running-gear.

With these and other objects in view, as will more fully hereinafter appear, the invention consists of the novel construction and arrangements of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a longitudinal sectional elevation of an excavating-machine constructed in accordance with the invention. Fig. 2 is a plan view of the same. Fig. 3 is a transverse sectional elevation of the machine on the line 3 3 of Fig. 1. Fig. 4 is a similar view on the line 4 4 of Fig. 1. Fig. 5 is a detail perspective view of the shovel or excavating-tool detached.

Similar numerals of reference indicate corresponding parts throughout the several figures of the drawings.

The working members of the apparatus are supported on a suitable vehicle comprising a body portion 1, having rigid transversely-disposed bolsters 2 in alinement with the axes of the front wheels, and to the outer ends of these bolsters are pivoted short axial members 3 for the support of the front wheels 4, and said axial members are provided with projecting arms 5, connected together by a transversely-disposed link 6. To the link is connected a steering-wheel 7, the connection being made by a suitable rack or by an auxiliary link, as at 8, in order that both of the front wheels may be simultaneously moved in steering the vehicle. The steering-wheel is located within convenient reach of a driver's seat 9.

The rear wheels are mounted on stub-axles 10, projecting from the stationary sides of the vehicle-body and leaving the whole of the bottom of the vehicle clear. The bottom is formed of a pair of hinged doors 11, that are connected by chains 12 to a winding shaft or drum 13, extending tranversely across the upper portion of the vehicle-body and provided at one end with a non-circular portion 14, to which a winding-crank is fitted, and in order to hold the doors in closed position the shaft is further provided with a ratchet-wheel 15, with which engages a pawl 16, pivoted to one side of the body portion.

To the bolsters at the front of the vehicle are secured brackets 17, and to these is pivoted a double tongue 18, the two members of which are spaced for a distance sufficient to permit of the introduction of the excavating devices between them, and at the front end of the tongues is a transversely-extending breastbar 19. At a convenient point on each side of the double tongue are arranged single or double trees 20, to which the draft-animals may be hitched.

To the members of the tongue 18 are secured hangers 21, forming bearings for a transversely-disposed shaft 22, on which are arranged a pair of colters or cutting-disks 23, the hubs of the colters being provided with threaded openings for the passage of set-screws 24, by which said colters may be locked in any desired position on the shaft. The colters are held in spaced relation by a plurality of sleeves 24', one or more of which may be removed should it be desired to alter the distance between the colters, and thus alter the width of the cut.

The opposite side members of the vehicle-body are provided with bearings or supports for the reception of a transverse bar 27, which extends through a pair of slots 28, formed in a pair of parallel bars 29, constituting the frame of the conveyer mechanism, and said bar forms a support for the upper portion of said mechanism. The lower portion of the conveyer is held in place by a transverse bolt 30, extending through the frame members 29 and the two tongues 18. At the upper and lower ends of the side bars 29 are bearings for the reception of transversely-disposed drums or rollers 33 34, over which extends an endless conveyer 35, formed of any suitable material. The shaft or spindle of the upper roller 33 is provided with a gear 36, which intermeshes with a gear 37, carried by a shaft 38, that is supported in bearings formed in a bracket 39, carried by one of the side members of the vehicle-body. The outer end of the shaft 38 carries a sprocket-wheel 40, that is connected by a link belt 41 to a sprocket-wheel 42, carried by one of the rear wheels, and as the machine is going along motion is transmitted through the gearing to the conveyer, and any excavated material deposited thereon will be carried up and dumped into the dirt-receptacle.

To the lower ends of the side bars of the conveyer-frame is secured a shovel or cutter 43, of a width corresponding to the distance between the two colters, and from the rear portion of the cutter extends arms 45, that are bolted or otherwise secured to the ends of the side bars, so that the cutter may be readily removed should repairs be necessary or when it is desired to substitute therefor a cutter of a different width. The rear portion of the cutter is concaved, as indicated by 46, and fits comparatively close to the conveyer-belt, so that little or no dirt will fall to the ground.

Extending transversely across the body portion of the vehicle is a winding shaft or drum 50, provided at one end or at both ends with non-circular portions for the reception of a winding-crank, and said shaft is further provided with a ratchet-wheel 51, with which engages a pawl 52, in order to hold the shaft from revolving. This shaft carries a pair of chains 54, the outer ends of which are connected to the two tongues 18, and when the shaft is turned in the proper direction the tongues will be moved until the colters and the cutter 43 are clear of the ground. This operative movement forces the members of the conveyer-frame to slide rearward of the transverse bar 27, and this results in the automatic disconnection of the gears 36 and 37, so that the vehicle may be traveled to the point where the excavated material is to be dumped without continuous operation of the conveyer.

In the operation of the device the vehicle is drawn along by two or more draft-animals, the tongue being first adjusted in accordance with the depth of the cut desired. The two colters traveling in advance of the cutter will form parallel vertical cuts in the ground and the horizontal cutter traveling between them will remove a slice of earth or other material and the latter will be pushed upward on the inclined conveyer, the colters forming side guards for the conveyer during its movement, and as soon as it is received on the moving surface will be conveyed upward and dumped into the receptacle. It is obvious that the cutters may be readily detached for the substitution of other of the same or different width and that the distance between the colters may be readily adjusted in accordance with the quantity of material to be removed.

While the machine is intended in the present instance to be of compact, light, and simple construction, so that it may be readily operated by a pair of horses, it is obvious that its size may be increased to any desired extent and that it may be successfully operated by a suitable traction-engine or other motive power.

Having thus described the invention, what is claimed is—

1. The combination with a wheeled frame having a dirt-receptacle, of a tongue connected to the front of the frame, a pair of colters supported by the tongue, an endwise-adjustable conveyer-frame, an endless conveyer supported thereby, a horizontal cutter disposed at the lower end of the conveyer-frame and working between the colters, and means for adjusting the conveyer-frame longitudinally and moving the horizontal cutter to and from the working position.

2. In combination, a wheeled frame, a tongue projecting from the forward end of the frame, a conveyer-frame carried by the wheeled frame and tongue, and having a slidable connection with one and a pivotal connection with the other, an endless conveyer supported by the frame, and a horizontally-disposed cutter disposed at the lower end of the conveyer-frame.

3. The combination with a wheeled frame having a dirt-receptacle, of a forwardly-projecting tongue, a conveyer-frame supported in part by the tongue, a conveyer on said frame, a cutting-tool at the lower end of the conveyer-frame, gearing connections for driving the conveyer, and means for elevating the tongue and conveyer-frame and thereby disconnecting the gearing.

4. The combination with a wheeled frame having a dirt-receptacle, of a double tongue projecting forwardly of the frame, a cross-bar carried by the members of the tongue, a conveyer-frame connected to said cross-bar, an endless conveyer on said frame, and gearing connections for imparting movement to the conveyer, a horizontal cutter arranged at the lower end of the conveyer-frame, and means for elevating the tongue thereby to move the cutter to inoperative position and to effect disconnection of the gearing.

5. The combination with a wheeled frame having a dirt-receptacle, of a double tongue projecting from the front end of the frame, a conveyer-frame supported by the tongue and provided with a longitudinal slot, a rigid cross-bar extending from said slot and forming a support for the upper portion of the conveyer-frame, a horizontal cutter detachably secured to the lower end of the conveyer-frame, a conveyer, gearing connection for driving the conveyer, a pair of colters carried by the tongue, and means for elevating the tongue thereby to adjust the cutting devices to inoperative position and to effect disconnection of the gearing.

6. The combination with a wheeled frame having a dirt-receptacle, and provided with means for the hitching of draft-animals thereto, of an excavating device arranged between the draft-animal connections and adjustable to operative and inoperative positions independently of such connections.

In testimony that I claim the foregoing as my own I have hereto affixed my signature in the presence of two witnesses.

JOHN D. BUCHANAN.

Witnesses:
   J. H. JOCHUM, Jr.,
   J. M. WALKER.